United States Patent [19]
Lee

[11] Patent Number: 5,537,470
[45] Date of Patent: Jul. 16, 1996

[54] METHOD AND APPARATUS FOR HANDLING IN-BOUND TELEMARKETING CALLS

[75] Inventor: Dooyong Lee, West Orange, N.J.

[73] Assignee: AT&T Corp., Murray Hill, N.J.

[21] Appl. No.: 223,809

[22] Filed: Apr. 6, 1994

[51] Int. Cl.⁶ .................................................. H04M 3/46
[52] U.S. Cl. .......................... 379/266; 379/265; 379/309; 379/209; 379/210; 379/142; 379/214
[58] Field of Search .................................. 379/127, 142, 379/214, 218, 265, 209, 266, 309

[56] References Cited

U.S. PATENT DOCUMENTS

| | | | |
|---|---|---|---|
| 4,162,377 | 7/1979 | Mearns | 379/207 |
| 4,191,860 | 3/1980 | Weber | 379/201 |
| 4,277,649 | 7/1981 | Sheinbein | 379/201 |
| 4,567,323 | 1/1986 | Lottes et al. | 379/142 |
| 4,653,045 | 3/1987 | Stanley et al. | 370/62 |
| 4,932,021 | 6/1990 | Moody | 370/54 |
| 4,987,587 | 1/1991 | Jolissaint | 379/94 |
| 5,062,103 | 10/1991 | Davidson et al. | 379/265 |
| 5,163,087 | 11/1992 | Kaplan | 379/142 |
| 5,185,786 | 2/1993 | Zwick | 379/201 |
| 5,200,990 | 4/1993 | Cho | 379/165 |
| 5,267,307 | 11/1993 | Izumi et al. | 379/142 |
| 5,268,958 | 11/1993 | Nakano | 379/142 |
| 5,283,824 | 1/1994 | Shaw | 379/142 |
| 5,309,504 | 5/1994 | Morganstein | 379/265 |
| 5,309,505 | 5/1994 | Szlam et al. | 379/214 |
| 5,311,574 | 5/1994 | Livanos | 379/209 |

OTHER PUBLICATIONS

"Engineering and Operations in the Bell System," R. F. Rey, Technical Editor, 2nd Edition, AT&T Bell Laboratories, 1982–1983, pp. 503–504.

*Primary Examiner*—Jeffery Hofsass
*Assistant Examiner*—Parag Dharia

[57] ABSTRACT

A method and apparatus for handling incoming calls to a service provider facility having a number of agent terminals. The method includes the steps of routing an initial call to an original agent at one of the agent terminals; storing for a predetermined time a caller identifier for the initial call and a corresponding agent identifier; identifying a subsequent call placed within the predetermined time by a caller having the stored caller identifier; and routing the subsequent call to one of the agent terminals in accordance with the stored agent identifier. If the original agent corresponding to the stored agent identifier is busy, the caller may be prompted to elect between waiting in a queue for the original agent, or connection to any available agent. The caller identifier may be, for example, a Calling Line Identity (CLI), an Automatic Number Identification (ANI), a telephone number of a caller terminal, or a portion of a calling card number. The service provider facility may include, for example, a private branch exchange (PBX) equipped with an automatic call distributor (ACD).

15 Claims, 2 Drawing Sheets

METHOD AND APPARATUS FOR HANDLING IN-BOUND TELEMARKETING CALLS

BACKGROUND OF THE INVENTION

1. Field of the invention

The present invention relates generally to improvements in telecommunication systems and services. More particularly, the present invention relates to improved handling of incoming calls in telemarketing applications.

2. Description of Prior Art

In-bound telemarketing refers generally to the transaction of business by telephone, and typically involves a service provider capable of simultaneously handling a number of incoming calls. Exemplary in-bound telemarketing applications include airline, hotel and rental car reservation systems, credit card, banking and other financial service systems, and catalog ordering systems. The incoming calls are made by customers to, for example, an 800 number of the service provider, and the calls are directed using well-known techniques to one of a number of available agent terminals in the service provider facility. In most telemarketing applications, the incoming calls are processed serially without regard to the identity of a particular caller. In the event that all of the agents are busy, the caller may receive, for example, an automated message indicating that calls are processed in the order received, and that the caller should remain on the line to wait for the next available agent. The incoming call is then placed in a queue until an agent becomes available.

When a caller is connected to a particular agent, the caller often supplies the agent with information such as, for example, credit card numbers, desired travel dates, times and destinations, or sizes, colors and the like for products to be ordered. In addition, the caller may have a unique problem necessitating a lengthy explanation to the agent, such as complicated travel plans or incorrect billing on a credit card. If a caller is, for example, inadvertently disconnected during a call, the caller generally must reinitiate the call by redialing the service provider number. The reinitiated call is then processed as any other original call, and the caller may again be placed in a queue and assigned to the first available agent. When the caller is finally reconnected, it is often to an agent other than the agent which handled the original call. As a result, the caller has to begin the transaction over from scratch, and supply a different agent with the same information previously supplied to the first agent. A similar problem results if the caller realizes, just after intentionally hanging up, that important information was overlooked or some other mistake was made. Such an approach is inconvenient and inflexible, and may be a source of considerable aggravation to certain callers.

An alternative approach, disclosed in U.S. Pat. No. 4,987,587, involves storing a caller identification in a database with information relating the caller identification to one of a number of possible destination numbers. When an incoming call is received from a caller whose identification has been previously determined and stored, the call is automatically directed to the corresponding destination number. As a result, certain customers for which stored records have been previously established may be assigned a higher priority in receiving service, or may always be connected to the same agent. However, most telemarketing applications receive a substantial number of their calls from unknown callers, many of whom may have had little or no previous contact with the service provider and therefore do not have an established customer record. U.S. Pat. No. 4,987,587 thus does not disclose techniques for efficiently handling calls from many, if not most, of the callers in a given telemarketing application.

As is apparent from the above, a need exists for efficient call handling in a telecommunication system, which does not treat reinitiated calls from disconnected callers the same as any other incoming call, and which does not require a previously-established customer record to provide service priority or direct a reinitiated call to an appropriate agent.

SUMMARY OF THE INVENTION

The present invention provides a method and apparatus for call handling in a service provider facility with a number of agent terminals, such that subsequent calls from callers previously disconnected within a predetermined time may be assigned to an appropriate agent. In accordance with one aspect of the present invention, a method is provided which includes the steps of routing an initial call to an original agent at one of the agent terminals; storing for a predetermined time a caller identifier for the initial call and a corresponding agent identifier; identifying a subsequent call placed within the predetermined time by a caller having the stored caller identifier; and routing the subsequent call to one of the agent terminals in accordance with the stored agent identifier. If, for example, the original agent corresponding to the agent identifier is busy, the caller may be prompted to elect between waiting in a queue for the original agent, or connection to any available agent. The caller identifier may be, for example, a Calling Line Identity (CLI), an Automatic Number Identification (ANI), a POTS or private telephone number of a caller terminal, or a portion of a calling card number. The service provider facility may include, for example, a private branch exchange (PBX) equipped with an automatic call distributor (ACD).

As a feature of the present invention, a caller disconnected for any reason may be, upon reinitiating the call, connected to the agent to which the caller was previously connected. As a result, the caller is not treated as any other caller and simply placed in a queue to wait for the next available agent.

As another feature of the present invention, the call handling techniques may be used by any in-bound caller who is disconnected, regardless of whether or not the caller has previously done business with the service provider. An established customer record is not required to provide a disconnected caller with a priority upon a reinitiated call.

The above-discussed features, as well as additional features and advantages of the present invention, will become more readily apparent by reference to the following detailed description and the accompanying drawings.

DETAILED DESCRIPTION

Figure 1:
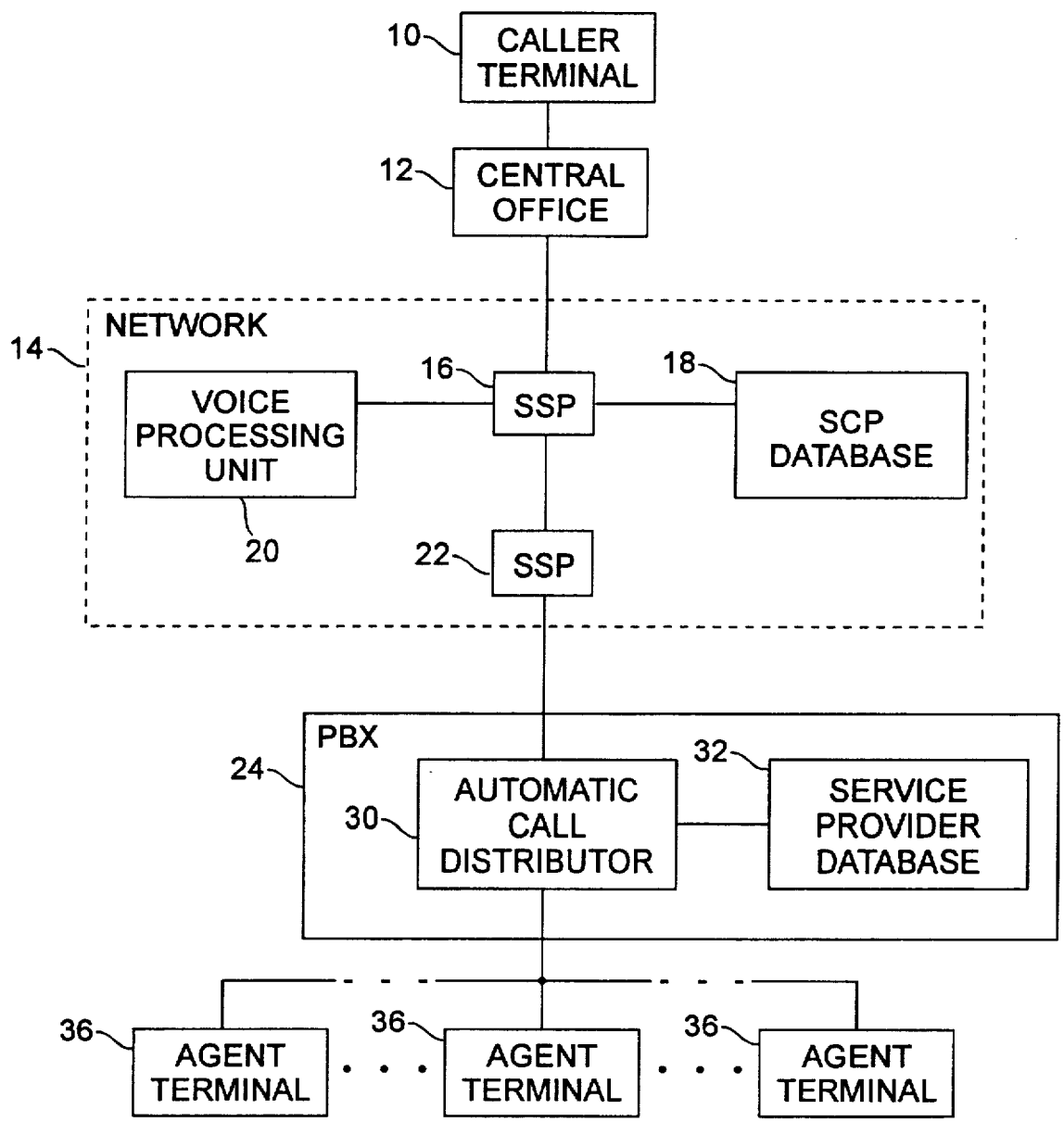
FIG. 1 is a block diagram of an exemplary telecommunication system with call handling in accordance with the present invention.

FIG. 1 shows an exemplary telecommunication system for use in accordance with the present invention. The exemplary system shown is a telephone network providing voice communications between a caller and a service provider such as, for example, an 800 number subscriber. As used herein, a service provider refers to a business or other operation using an in-bound telemarketing facility to service its customers, and may be, for example, an airline, hotel or car rental agency, or a bank or other financial institution. To contact the service provider, the caller initiates a call from a caller terminal 10, which may be a telephone with a corresponding Plain Old Telephone Service (POTS) number. The call initiated at terminal 10 is routed to a central office 12, which may be a local exchange switch within a local exchange carrier (LEC) network. The central office may be, for example, a 5ESS® Switching System, manufactured by American Telephone & Telegraph Co., Inc. (AT&T). Central office 12 directs the call to a switching network 14, which may be a long distance carrier network, an inter-exchange carrier (IXC) network, or an LEC network.

The exemplary switching network 14 includes a first service switching point (SSP) 16, a service control point (SCP) database 18, and a second SSP 22. Each of the SSPs 16, 22 may be a toll office with Common Channel Signalling (CCS) capability, such as the 4ESS® Switching System manufactured by AT&T. The CCS capability provides a high-speed packet-switched data link which may, for example, carry network control information to or from SCP database 18. Network control using CCS is described in, for example, U.S. Pat. No. 4,162,377, entitled "Data Base Auto Bill Calling Using CCIS Direct Signaling," and U.S. Pat. No. 4,277,649, entitled "Method and Apparatus for Screening Telephone Calls," both assigned to the assignee of the present invention and incorporated by reference herein. An exemplary type of CCS suitable for use in the present invention is CCS No. 7, also known as Signalling System 7 (SS7). Alternatively, each of the SSPs 16, 22 may be inter-exchange switches in a long distance carrier or IXC network, or local exchange switches in an LEC network.

Calls placed at caller terminal 10 are directed by central office 12 to first SSP 16. For certain types of calls, such as calls to a service provider who is an 800 subscriber, the first SSP 16 accesses the SCP database 18. The information within the SCP database 18 includes routing instructions which direct SSP 16 to route the incoming call in a particular manner. Generally, SCP database 18 will contain routing information for 700, 800, 900 or calling card service calls. In the exemplary system of FIG. 1, the routing instructions stored within the SCP database 18 may, for example, direct SSP 16 to route an incoming 800 service call to the second SSP 22. SSP 22 may then route the call to a private branch exchange (PBX) 24. The routing instructions stored within SCP database 18 may alternatively direct SSP 16 to route an incoming call to a voice processing unit (VPU) 20, or to an appropriate operator, in order to provide interactive services to the caller terminal 10 via SSP 16 and central office 12.

The PBX 24, which may be physically located within a service provider facility, includes an automatic call distributor (ACD) 30 which is capable of accessing a service provider database 32. The ACD 30 distributes incoming calls received in the PBX 24 to any of a number of agent terminals 36, in a manner well-known in the art. ACDs are described in greater detail in, for example, pp. 503–504 of "Engineering and Operations in the Bell System," Second Edition, AT&T Bell Laboratories, Murray Hill, N.J., 1983, which are incorporated by reference herein. The group of agent terminals 36 in the service provider facility may be identified by one or more assigned Inward Wide Area Telephone Service (INWATS) 800 numbers which may be dialed from the caller terminal 10. INWATS 800 service is described in greater detail in U.S. Pat. No. 4,191,860, entitled "Data Base Communication Call Processing Method," assigned to the assignee of the present invention and incorporated by reference herein.

In alternative embodiments, the PBX 24 may be replaced with other call processing hardware, including, for example, a central office with centrex service. Centrex service generally provides PBX-like features within public switching equipment. Exemplary centrex services include the Business and Residence Custom Services (BRCS) of the 5ESS® Switching System, and the 1AESS® centrex service, both available from AT&T. In addition, although the ACD 30 and database 32 are shown in FIG. 1 as contained within PBX 24, the ACD and database could also be located outside the PBX.

In general, every POTS caller terminal connected to a telephone line has a unique Calling Line Identity (CLI), which may be used to identify the individual, household or business using that terminal. The PBX 24 can identify a particular caller terminal 10 by a CLI associated with that terminal in a manner well-known in the art. Additional detail on CLI-based call processing may be found in, for example, U.S. Pat. No. 4,277,649, cited above. In an alternative embodiment, the PBX may use an Automatic Number Identification (ANI) of a caller terminal as a caller identifier. ANI is also well-known in the art and is described in greater detail in, for example, U.S. Pat. No. 5,163,087, which is incorporated by reference herein. Other caller identifiers in accordance with the present invention include the POTS or private telephone number of the caller terminal, and a telephone credit card number used by the caller to place calls, all of which the PBX 24 is capable of recognizing and processing in a known manner. When a telephone credit card number, also referred to as a calling card number, is used as a caller identifier, it may be desirable to use only a portion of the card number in order to prevent unauthorized access to the card number. The portion of the card number used may therefore be, for example, a subset of the digits in the number, or a portion excluding a personal identification number (PIN).

Figure 2:
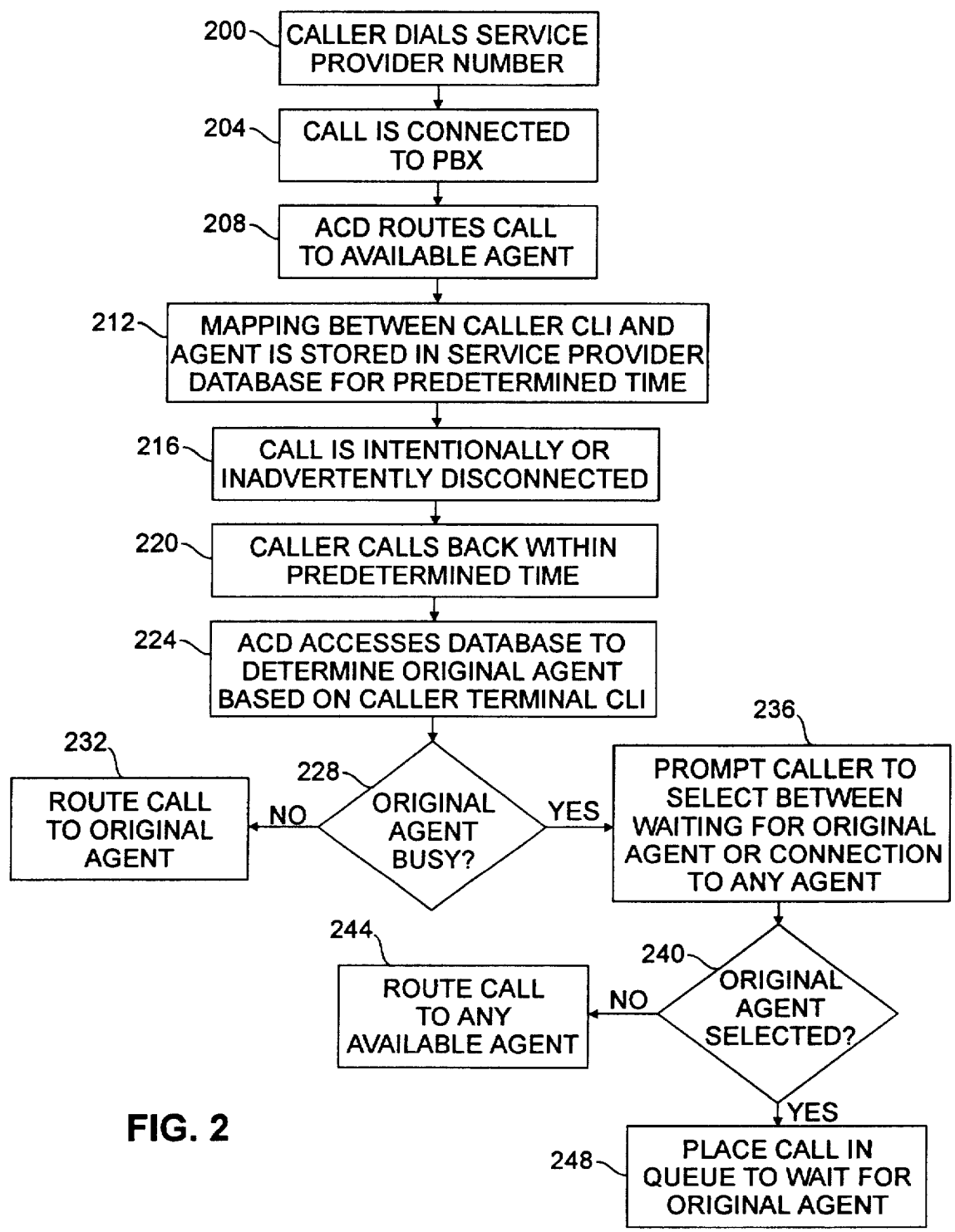
FIG. 2 is a flow diagram illustrating an exemplary call handling method in accordance with the present invention.

FIG. 2 shows an exemplary call flow diagram illustrating call handling in accordance with the present invention, using the telecommunication system of FIG. 1. A caller initially places a call to a service provider by, for example, dialing a corresponding INWATS 800 number, as noted in operation block 200. The initial call is then connected to the PBX 24, or to other call processing hardware in the service provider facility, in the manner previously described, as shown in operation block 204. The ACD 30 within the PBX 24 then routes the initial call to an available agent at one of the agent terminals 36, as shown in operation block 208. If all agents are busy, the call may be placed in a queue to wait for an available agent. Block 212 indicates that, for an incoming call connected to an agent terminal, the present invention involves storing both a caller identifier, such as the caller CLI, and a corresponding agent identifier. The agent identifier specifies, for example, the original agent to which the initial incoming call is connected. Although the agent identifier will preferably specify an agent receiving the initial call, in alternative embodiments the agent identifier could specify, for example, an agent terminal to which the initial call is routed, rather than the particular agent occupying the terminal, or a group of agents which usually handle certain types of calls.

The caller identifier and corresponding agent identifier are stored such that the agent identifier may be identified from the caller identifier, and the two stored identifiers are therefore referred to herein as a caller-agent mapping. The caller-agent mapping may be implemented using, for example, a simple look-up table in the service provider database 32. The look-up table could include a column of caller identifier entries for each of the incoming calls, and a corresponding column of entries with an agent identifier for each call. Any of a number of other storage means or techniques could also be used to store a caller-agent mapping. In addition, the mapping could be stored in other equipment in the service provider facility, instead of in database 32, or more generally in other equipment in the telecommunication system.

In accordance with the present invention, the caller-agent mapping for a given initial incoming call is stored for a predetermined time. As used herein, the predetermined time will generally be a short time period, on the order of minutes or hours. Prior art techniques, by contrast, store customer records for much longer time periods, such as months or years. The predetermined time may be chosen to exceed the average length of a desired percentage of incoming calls, and will therefore usually vary depending upon the telemarketing application. For example, an airline reservation system may complete processing for 95% of its incoming calls within ten minutes. By storing a caller-agent mapping for fifteen minutes, the desired call handling will be possible for, on average, at least 95% of the callers. Of course, higher percentages of callers could be provided with the call handling of the present invention by storing the caller-agent mapping for a longer predetermined time period. Although in the present embodiment the predetermined time is measured from the connection of an incoming call to an agent terminal, alternative embodiments could measure the predetermined time from, for example, the time the call is disconnected, or the time the mapping is stored in the database 32.

As shown in operation block 216, a caller may be disconnected during the call, either intentionally or inadvertently, and for any of a number of reasons. Often, the caller is disconnected before having a chance to complete the desired transaction. In accordance with the present invention, a caller who calls back the service provider within the predetermined time may be directed to the agent which serviced the original call. In operation block 220, the caller previously connected to an agent places a subsequent call to the service provider, by again dialing the appropriate number. The present invention then identifies a subsequent call placed by a caller within the predetermined time by, for example, locating the stored caller identifier in the database 32. For example, as shown in block 224, the ACD 30 may access the caller-agent mappings stored in service provider database 32 to attempt to determine an original agent, if any, corresponding to the caller identifier. In one embodiment of the present invention, the caller identifier used is the CLI of the caller terminal. As noted above, other embodiments of the present invention may use, for example, an ANI of the caller terminal, a POTS or private telephone number of the caller terminal, or a portion of a calling card number as a caller identifier.

If the ACD locates the caller identifier within the database 32, this indicates that the caller has been previously connected to an agent terminal, then intentionally or inadvertently disconnected, and has placed a subsequent call to the service provider within the predetermined time. As a result, the caller is entitled to priority in reaccessing the agent handling the original call, and the subsequent call may then be routed to an agent terminal in accordance with the corresponding stored agent identifier. If a caller-agent mapping for an incoming caller is not found in the service provider database 32, the caller is treated as any other caller and given no priority in accessing a particular agent. Once a caller determined to have no stored caller-agent mapping is connected to an agent, a caller-agent mapping may then be stored for that caller, to provide priority access to the corresponding agent on any subsequent calls within the predetermined period.

After a caller-agent mapping is located for an incoming call in the service provider database 32, a determination may be made as to whether or not the original agent is busy, as shown in decision block 228. If the original agent is not busy, the incoming call may be routed directly to the original agent, as shown in block 232. If the original agent is busy, operation block 236 indicates that the caller may be prompted to elect between waiting in a queue for the original agent, or connection to any other available agent. Callers having invested significant time and effort in explaining a unique situation to a particular agent will therefore be able to elect to wait until that agent becomes available. On the other hand, callers who have previously called within the predetermined period but have an inquiry which can be handled by any agent can elect to be connected directly to the next available agent. The caller may respond to the prompt of operation block 236 by, for example, entering dual-tone multiple-frequency (DTMF) commands from a touch-tone telephone, or by responding with appropriate voice commands. Either the DTMF or voice commands may be recognized by incorporating well-known command recognition hardware into the ACD 30 or elsewhere in the PBX 24.

In decision block 240, the caller response command is received and interpreted to determine whether or not the caller wants to be reconnected to the original agent. The call is then directed in accordance with the received and interpreted command. For example, if the caller does not elect to wait for the original agent, the call may be routed to any available agent, as shown in operation block 244. The caller is then basically treated as any other incoming caller who has not had previous contact with the service provider within the predetermined time. If the caller does elect to wait for the original agent, the call may be directed to an appropriate queue separately maintained for each of the agent terminals 36.

In the event a particular agent is leaving a terminal and will no longer be processing incoming calls due to, for example, a lunch break or completion of a work shift, the agent may provide instructions from an agent terminal 36 to the ACD 30 to eliminate any caller-agent mappings stored in the database 32 with their agent identifier. Callers reinitiating calls to the service provider within the predetermined time will then be treated as any other incoming caller. Alternatively, an agent could instruct the ACD 30 to stop storing caller-agent mappings for them before a known interruption in their call processing, and then remain at their terminal servicing calls in the normal manner until the predetermined time expires for the last call for which a caller-agent mapping was stored with their agent identifier. If an agent moves to a different agent terminal, the ACD 30 may be instructed to route any incoming calls matching a stored caller-agent mapping for that agent to the new agent terminal. If the agent identifier specifies an agent terminal rather than a particular agent, the agent could instruct the ACD 30 to update with a new agent identifier any of the stored caller-agent mappings having the old agent identifier. The ACD can be readily configured, in a manner well-known in the art, to supply particular incoming calls to any of the agent terminals 36.

In another embodiment of the present invention, an agent may provide an indication to the ACD when a call has been inadvertently disconnected. In the event a caller is inadvertently disconnected, there is generally a higher likelihood that they will call back and want to be connected to the original agent. The ACD could therefore direct incoming calls such that the disconnected agent does not receive any new calls for a short period of time, on the order of a minute or so. This will ensure that the disconnected agent will not be busy if the disconnected caller calls back immediately.

As noted above, the ACD 30 determines, for each incoming call, whether the corresponding caller has previously called within the predetermined time. After a caller is identified as having previously called within the predetermined time period, the ACD 30 may, for example, again store a caller-agent mapping for that call in case the second call is disconnected and the caller places a third call within a predetermined time from the connection of the second call. If the caller making a second call within the predetermined time is again connected to the original agent, the ACD will then, in effect, be restarting the predetermined time from the second connection. If the caller elects connection to any agent, a new caller-agent mapping may be stored for the caller depending upon which agent eventually receives the call. When the new mapping is stored, the old mapping could be deleted. Alternatively, the new mapping could be stored along with any older mappings for which the predetermined time has not yet expired. If a caller having two or more stored mappings calls back within the appropriate predetermined time, and the agent corresponding to the most recent mapping is busy, the caller could be prompted to elect between waiting in a queue for the most recent agent, or connection to an agent corresponding to an older stored mapping. In other embodiments, the caller could be initially prompted to select any of the agents for which a mapping is stored. This would accommodate, for example, a caller who prefers connection to an original agent even though an agent corresponding to the most recent stored mapping is not busy.

In the above embodiments, a new predetermined time period is generally started upon each connection to an agent. In alternative embodiments, the caller-agent mapping could be eliminated for callers repeatedly calling back within the predetermined time, in order to provide a more uniform distribution of callers to agents. For example, if a caller calls back for a second time within a predetermined period, the ACD 30 could be directed either not to store a caller-agent mapping for the call, or to eliminate a previously-stored caller-agent mapping. The direction could come from a particular agent terminal, or could be based on, for example, a counter maintained in the service provider database 32 indicating the number of times a caller-agent mapping has been re-stored for a given caller identifier.

It should be noted that the communication system with which the present invention has been described is exemplary only. The equipment shown may be replaced with other types of telecommunication equipment as appropriate in a given application. For example, the ACD 30 may be any of a number of known systems for distributing incoming calls among a number of agent terminals. Many other variations may be made in the embodiments described above, including, for example, the amount of time a caller-agent mapping is stored, the particular caller and agent identifiers used, the type of hardware used in the service provider facility, the type of storage means in which the caller-agent mapping is stored, and the means by which the stored information is accessed. These and other alternatives and variations will be readily apparent to those skilled in the art, and the present invention is therefore limited only by the appended claims.

We claim:

1. A method of handling incoming calls to a service provider facility including a plurality of agent terminals, the method comprising the steps of:
   (a) routing an initial call from a caller dialing a number of the facility to an original agent at one of the agent terminals;
   (b) storing for a predetermined time a caller identifier for the initial call and a corresponding agent identifier;
   (c) identifying a subsequent call placed within the predetermined time by the caller having the stored caller identifier;
   (d) determining if the original agent corresponding to the agent identifier is busy prior to routing the subsequent call to the original agent; and
   (e) taking one of the following actions depending upon the determination of step (d);
      (i) either routing the call to the original agent in accordance with the stored agent identifier if the original agent is not busy, or,
      (ii) prompting the caller to elect between waiting for the original agent or connection to any agent if the original agent is busy; and further, if the caller is prompted to elect, also receiving a command from the caller in response to the prompt; and directing the call in one of two ways in accordance with the command either to be processed as any other incoming call if the caller elects the connection to any agent or to a queue if the caller elects to wait for the original agent.

2. The method of claim 1 wherein said caller identifier and said corresponding agent identifier are stored in a database and said step of identifying said subsequent call further includes locating said caller identifier in said database.

3. The method of claim 1 wherein said caller identifier is a Calling Line Identity (CLI) of a caller terminal used by said caller.

4. The method of claim 1 wherein said caller identifier is an Automatic Number Identification (ANI) of a caller terminal used by said caller.

5. The method of claim 1 wherein said caller identifier is a portion of a calling card number used by said caller to place said calls.

6. The method of claim 1 wherein said agent identifier specifies said one of said agent terminals to which said initial call is routed.

7. The method of claim 1 wherein said agent identifier specifies said original agent receiving said initial call.

8. An apparatus for handling incoming calls to a service provider facility including a plurality of agent terminals, comprising:
   means for routing an initial call from a caller dialing a number of the facility to an original agent at one of the agent terminals;
   means for storing for a predetermined time a caller identifier for the initial call and a corresponding agent identifier;
   means for identifying a subsequent call placed within the predetermined time by the caller having the stored caller identifier;
   means for routing the subsequent call to one of the agent terminals in accordance with the stored agent identifier;
   means for prompting the caller to elect between waiting for the original agent corresponding to the agent identifier or connection to any agent if the original agent is busy;

means for receiving a command from the caller in response to the prompt;

means for directing the call in accordance with the command; and a queue in which the subsequent call is placed if the caller elects to wait for the original agent.

9. The apparatus of claim 8 wherein said means for storing said caller identifier and said agent identifier include a database, and said means for identifying said subsequent call include means for locating said stored caller identifier in said database.

10. The apparatus of claim 8 wherein said means for identifying and routing said subsequent call include an automatic call distributor.

11. The apparatus of claim 8 wherein said caller identifier is a Calling Line Identity (CLI) of a caller terminal used by said caller.

12. The apparatus of claim 8 wherein said caller identifier is an Automatic Number Identification (ANI) of a caller terminal used by said caller.

13. The apparatus of claim 8 wherein said caller identifier is a portion of a calling card number used by said caller to place said calls.

14. The apparatus of claim 8 wherein said agent identifier specifies said one of said agent terminals to which said initial call is routed.

15. The apparatus of claim 8 wherein said agent identifier specifies said original agent receiving said initial call.

* * * * *